Nov. 18, 1958  L. H. FLORA  2,860,741
FASTENING CONSTRUCTION
Original Filed Oct. 24, 1952
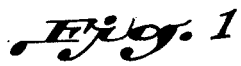
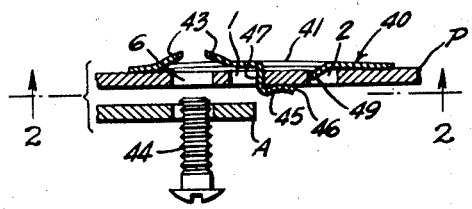
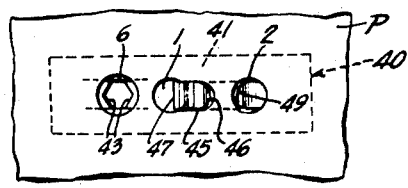
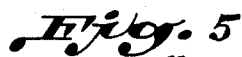
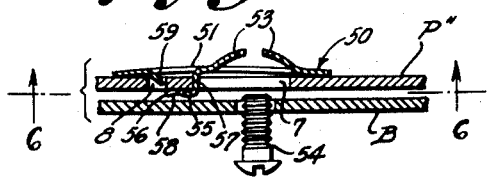
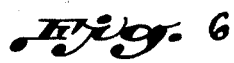
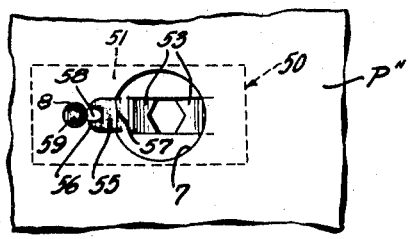
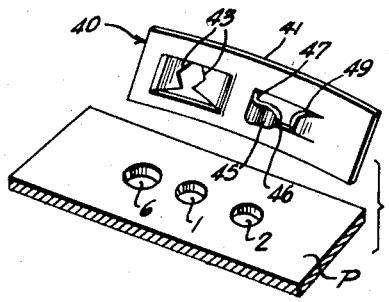
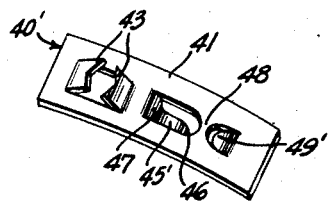
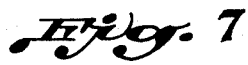
INVENTOR
LAURENCE H. FLORA
BY H. L. Lombard
ATTORNEY

2,860,741 
Patented Nov. 18, 1958

2,860,741

FASTENING CONSTRUCTION

Laurence H. Flora, Cleveland, Ohio, assignor to Tinnerman Products, Inc., Cleveland, Ohio, a corporation of Ohio Original application October 24, 1952, Serial No. 316,673, now Patent No. 2,689,992, dated September 28, 1954. Divided and this application August 11, 1954, Serial No. 449,081

3 Claims. (Cl. 189—36)

This invention relates to attachable types of fastening devices designed for ready attachment to an apertured supporting part to provide the same with means for securing a cooperating part thereto or for securing a structural member, object or article of manufacture to said supporting part. This application is a division of prior copending application Serial Number 316,673, filed October 24, 1952 and now Patent No. 2,689,992.

The invention is directed, more particularly, to various forms of fastening devices having a clip type attaching means for attaching the fastener onto an apertured supporting part together with means for retaining or mounting a cooperating part on the supporting part, or other fastening means for holding or retaining an object or article in secured relation to the supporting part.

The improved clips or fasteners of the invention are especially advantageous for securing assemblies in which only a relatively small area is available for attaching the fasteners, or when the fasteners must be attached in small, close quarters as is required in many installations wherein space is at a premium. In this regard, the fasteners of the present invention comprise a clip type attaching means which is readily provided for attachment in a relatively small area together with a locking means adapted to retain the fastener in applied position against accidental removal, shifting or displacement.

A primary object of the invention, therefore, is to provide various forms of fasteners having an attaching means in the form of a clip or hook, or the like, which is readily received in secured relation in an opening in a supporting part together with a locking detent in the form of a tab extending toward said hook in opposed relation thereto in a manner whereby both said hook and tab are formed in a relatively small area in providing the fasteners in relatively small sizes for use in small size assemblies or in other locations where space is limited.

Another object of the invention is to provide various forms of fasteners having such a clip type attaching means in which the attaching hook and locking tab are provided in inwardly extending opposed relation, as aforesaid, and with the locking tab formed from a portion of the hook in a manner whereby both said attaching hook and locking tab are provided in an exceptionally small area of the fastener so that the fastener may be provided in the smallest of sizes that may be necessary or desirable.

A further object of the invention is to provide various types of fasteners such as described, in which the fasteners are provided with a clip type attaching means comprising a hook adapted to be easily and quickly slid into fastening position in an opening in a supporting part together with a locking tab in inwardly extending opposed relation to the extremity of said hook and which is adapted to seat in an adjacent opening in the support to lock the fastener in attached position against inadvertent disconnection or accidental loosening or displacement.

Another object of the invention is to provide various types of such fasteners of general utility in which the fasteners comprise a clip type attaching means in the form of a hook and locking tab in inwardly extending opposed relation to each other, as aforesaid, together with means for holding or retaining a bolt or screw for securing a cooperating part to said supporting part.

A further object of the invention is to provide various types of attachable fasteners of the kind described, which are adapted for attachment to supporting parts of different thicknesses.

Further objects and advantages, and other new and useful features in the construction, arrangement and general combination of elements in the various fasteners of the invention will be apparent as the following description proceeds with reference to the accompanying drawings, for purposes of illustration but not of limitation, in which like reference characters designate like parts throughout, and in which:

Fig. 1 is a vertical sectional view of an assembly showing one form of fastener in accordance with the invention as provided in a device having a nut portion for threadedly engaging a bolt or screw securing a cooperating part to the supporting part;

Fig. 2 is a view along line 2—2 of Fig. 1 showing the underside of the supporting part with the fastener attached thereto; and, Fig. 3 is a perspective view showing a fragment of the supporting part as prepared with perforations for the attachment of the fastener of Figs. 1 and 2 which is also shown in perspective in position for attachment to said supporting part.

Fig. 4 is a perspective view of a fastener similar to that shown in Figs. 1–3, inclusive, as provided with the attaching means in an alternate form.

Fig. 5 is a vertical sectional view similar to Fig. 1 showing another form of fastener having a nut portion for threadedly engaging a bolt or screw and provided with a clip type attaching means especially suited for such fasteners as provided in a relatively small size;

Fig. 6 is a view along line 6—6 of Fig. 5, looking in the direction of the arrows, and shows in bottom plan the supporting part with the fastener attached thereto; and, Fig. 7 is a top plan view of the fastener per se shown employed in Figs. 5 and 6.

The various fasteners of the invention are of general utility and may be readily constructed for use in a wide range and variety of assemblies in proportion to the size and contour of the parts secured. The fasteners are particularly suited for use in providing an apertured supporting part with bolt or screw engaging means for securing thereto a cooperating part, object or article of manufacture by an operation taking place from the forward side thereof as is required in a blind location, for example.

Referring now, more particularly, to the drawings, Figs. 1–3, inclusive, show one form of fastener 40 in accordance with the invention as provided in an attachable nut device by which an object A may be secured to the supporting part P by a bolt or screw 44 applied from the forward or readily accessible side of said part P without need for holding said fastener at the rearward side thereof.

The supporting part P, may be of any suitable material such as sheet metal, wood, fiber board, or the like; however, inasmuch as the invention is employed mainly in metallic structures, the supporting part P is usually in the form of a metallic panel or plate-like member. In order to adapt the supporting part P for use with the fastener 40, said part P is provided with a perforated area comprising a pair of spaced openings 1, 2, which may be of any suitable outline but preferably are provided as ordinary circular openings formed by a simple punching or drilling operation at the same time that the passage 6 for the bolt or screw 44 is provided in said supporting part. The openings 1, 2, may be of substantially the same size or the opening 2 may be slightly smaller for a close, snug fit of the fastener in attached position.

The fastener 40 is constructed from a relatively small, inexpensive blank of sheet metal which is readily obtained from standard strip stock with little loss or waste of material. Any suitable sheet metal may be employed but preferably that of a spring metal nature such as spring steel or cold rolled steel having spring-like characteristics. The blank is bent to define a base or body portion 41 which preferably is arched or bowed upwardly as seen in Fig. 1 and is provided with an attaching hook or finger 45 and a locking detent in the form of a tab 49 both stamped from a single cutout area of the fastener base 41 to project from the underside thereof with the ends of said hook 45 and tab 49 extending inwardly toward each other in opposed relation. It is to be appreciated that such a hook and detent construction in inwardly extending opposed relation to each other is readily provided in a relatively small area as is necessary or desirable in instances where the attaching means for the fasteners must be of relatively small size.

The hook or finger 45 extends in generally parallel and spaced relation to the underside of the fastener base 41 and is biased inwardly to provide an intermediate resilient cam surface that is normally spaced from said base 41 a distance slightly less than the thickness of the supporting part P adjoining the opening 1 so that said cam surface causes the hook to engage the adjacent surface of said part P under spring tension in the attached position of the fastener. Preferably the end of said hook 45 is provided in an outwardly flared lip 46 having a rounded extremity for facilitating the initial application of the hook 45 over the engaged marginal edge portion of the circular opening 1. The arrangement, otherwise, is such that the portion of the hook or finger 45 adjoining the base 41 defines a shoulder 47 adapted to engage a wall of the opening 1 in the attached position of the fastener as seen in Fig. 1, while the tab or detent 49 defines a rounded projecting shoulder for snugly engaging the adjacent wall of the other circular opening 2 to lock said hook 45 in such attached position. The extremity of the locking tab 49 is rounded to conform to the contour of the associated opening 2 and is spaced from the shoulder 47 of the hook 45 a distance substantially equal to or slightly greater than the distance between the wall portions of the respective openings 1, 2, engaged thereby such that the fastener is fixedly and rigidly secured in attached position against shifting or displacement.

The hook 45 is thus provided on one end of said base 41 together with the locking tab 49 having a rounded extremity and extending inwardly in opposed relation to said hook 45. The other end of said base 41 is provided with a nut portion in the form of integral tongues 43, or the like, for threadedly engaging the bolt or screw 44 in the manner of a nut.

Such tongues 43 or equivalent thread engaging means may be pressed, stamped, extruded or otherwise provided on the fastener base 41 in any suitable form or construction so long as the same threadedly engage with the thread of the bolt or screw 44 in the manner of a nut, and, in this relation, the present invention fully contemplates the provision of such thread engaging means in various other similar and related forms, as in the manner of a perforated protuberance which is pressed from the sheet metal body of the fastener and shaped to provide a helical thread or thread opennig, or otherwise has the wall thereof tapped to provide a plurality of thread convolutions for threadedly engaging the bolt or screw 44. Such thread engaging means prepared in the form of cooperating, yieldable tongues 43, as shown, are possessed of unusual inherent strength and will not collapse or pull through when the bolt or screw 44 is tightened, nor loosen under continuous strain and vibration in the installation. This takes place by reason of the fact that the sheet metal material from which such tongues 43 are formed is of less thickness than the pitch or spacing between adjacent thread convolutions of the bolt or screw 44, wherefore the extremities of said tongues 43 tend, more effectively, to move toward each other and cut into the grooves intermediate the adjacent thread convolutions on the bolt or screw 44 when tightened therewith and otherwise become embedded in the root of the bolt or screw in locked, frictional fastening engagement therewith in applied fastening position.

With the fastener 40 thus provided and the supporting part P prepared with the spaced openings 1, 2, and the bolt passage 6, the fastener 40 is easily and quickly applied to a positive locked attachment on the supporting part P with the hook 45 received in the similar opening 1 and the locking tab 49 received in the opening 2, and with the nut portion 43 aligned with said passage 6 prepared in the part P along with said openings 1 and 2, as illustrated in Fig. 3. The attachment of the fastener 40 in this manner is easily and quickly effected simply by inserting the end of the hook 45 into the opening 1 and manipulating the same in a manner whereby said hook 45 is cammed against the edge of said opening 1 and is thereby flexed outwardly from the fastener base 41 as necessary to engage the underside of part P adjacent said opening 1. The outwardly flared lip 46 facilitates this initial step in applying the hook 45, and accordingly, by depressing the arched base 41 and simultaneously sliding the fastener in the direction of the free end of said hook 45, said hook 45 clears the underside of the supporting part P and permits the fastener to be advanced to its fully applied fastening position to the point at which the shoulder 47 of the hook engages the adjacent wall of the opening 1, substantially as shown in Fig. 1. At this position, the locking tab 49 lies over the other opening 2 such that the extremity of said locking tab 49 snaps into engagement with the adjacent wall of said opening 2 inasmuch as the extremity thereof has a predetermined spacing from the shoulder 47 on the hook for this purpose. Thus, the shoulder 47 of the hook and the extremity of the locking tab 49 engage the adjacent walls of the openings 1, 2, respectively, in the manner of opposite abutments acting in opposite directions to prevent shifting or displacement of the retainer from its final applied position. Additionally, the construction by which the hook 45 and locking tab 49 are received in the spaced openings 1, 2, respectively, provides an arrangement wherein the fastener is positively held against turning or relative rotative movement on the supporting part P which, of course, is not possible in the case of a fastener having such hook type attaching means secured in a single circular opening in a supporting part.

A fastener of this character is advantageously provided with an arched or bowed body 41 which may be depressed as necessary to permit the hook 45 to engage the underside of supporting parts of different thicknesses and otherwise compensate for manufacturing variations and irregularities in the thickness of the part P in the area of the attaching opening 1 therein. However, while such an arched base or body construction is preferable, it is not absolutely essential inasmuch as the inwardly biased formation of the hook 45 provides for a limited yielding of said hook as necessary to engage supporting parts of slightly different thicknesses or having slight variations or irregularities adjacent the attaching opening 1.

The fastener 40 is thus attached in accordance with the foregoing, to self-sustained fastening position on the supporting part P in readiness for the application of the bolt or screw 44 through the passage 6 into threaded engagement with the thread engaging means 43 of the fastener to secure the cooperating part A to said supporting part P in a completed assembly.

Fig. 4 shows a fastener 40' similar to that of Figs. 1-3, inclusive, as provided with the attaching means in the alternate form in which the hook 45' and locking tab 49' are provided with a web 48 between the ends thereof so that said hook 45' and tab 49' may be provided with the advantageous rounded extremities without need for removing said intermediate web 48 in a special operation requiring a thin, relatively fragile cutter which must be frequently replaced.

Figs. 5-7, inclusive, show a further embodiment of the invention in which the fastener 50 is provided with a nut portion comprising integral tongues 53 formed from the base 51 of the fastener as described with reference to the fastener of Figs. 1-3, inclusive. This nut type of fastener 50, likewise, is adapted to be attached in self-sustained fastening position on a supporting panel P" preparatory to the application of a cooperating bolt or screw 54 to said tongues 53 to secure a cooperating part B to said supporting panel P". The fastener 50 preferably is provided with a generally arched or bowed base 51 with the nut portion 53 formed at one end thereof. The hook 55 and locking tab 59 are stamped from said base 51 adjacent said nut portion 53 with said hook 55 being provided in the same general form to include an outwardly flared lip 56 on its extremity and a shoulder 57 adjoining the base 51.

However, in order to provide the hook 55 and locking tab 59 in a much smaller, minimum area for such a small size fastener, they are formed in a special construction by which said locking tab 59 is provided from a slotted portion 58 in the end of the hook 55, as shown in Fig. 7, such that the locking tab 59 depends from the fastener base 51 but actually is substantially formed from the material of said hook 55.

In attaching the fastener 50, thus provided, the supporting part P" is prepared with an enlarged hole 7 serving both as a passage for the bolt or screw 54 and as an attaching opening by which the hook 55 is passed through said hole 7 to engage the underside of said part P" adjacent said hole 7 in the attached position of the fastener as shown in Figs. 5 and 6. The locking tab 59 is received in a smaller opening 8 prepared in the supporting part P" in predetermined spaced relation to the hole 7 to lock the fastener in attached position with the nut portion 53 aligned with the hole 7 in readiness for the application of the bolt or screw 54 to said nut portion 53 to secure the cooperating part B to said supporting part P". In this regard, the locking tab 59, as seated in the smaller hole 8, advantageously prevents relative turning or rotation of the fastener 50 along with the bolt or screw 54 as it is turned into threaded engagement with the nut portion 53, whereas the fastener would otherwise be subject to such turning or rotation of the fastener relatively to the supporting part P" if attached solely by the hook 55.

The fastener in any form preferably is constructed of relatively thin sheet metal the thickness of which is selected according to service requirements and the predetermined size of the parts to be secured. The fasteners are most effective when provided of spring metal suitably tempered and otherwise treated to give the desired toughness and hardness, particularly in the case of devices intended for use in heavy duty applications. A cheap and highly practical fastener in any form, may be provided from cold rolled metal such as cold rolled steel which is untempered but of a spring metal nature and capable of providing an effective and reliable fastener, as and for the purposes described.

While the invention has been described in detail with specific examples, such examples are intended as illustrations only inasmuch as the invention fully contemplates various modifications which may be provided without departing from the spirit and scope of the invention.

What is claimed is:

1. A fastening construction comprising a supporting part in the form of a plate or panel provided with three openings in spaced relation, and a fastener comprising a piece of sheet metal defining a base attached to said supporting part over said openings, said base comprising a portion carrying bolt or screw engaging means and a portion at one side of said bolt or screw engaging means having a partially severed area defining a hook and a cooperating tab both projecting from the underside of said base, said tab having a free end severed from the base, said hook and tab being in spaced relation to each other and said tab facing the free end of said hook, said bolt or screw engaging means overlying one of said openings in said supporting part, said hook extending through a second of said openings and engaging a marginal portion thereof, and said tab being in abutting relation to the wall of the third of said openings thereby retaining said hook against removal from attached position.

2. A fastening construction comprising a supporting part in the form of a plate or panel provided with three openings in spaced relation, and a fastener comprising a piece of sheet metal defining a rectangular arched base attached to said supporting part over said openings, said arched base comprising a portion carrying bolt or screw engaging means and a portion at one side of said bolt or screw engaging means having a partially severed area defining a hook and a cooperating tab both projecting from the underside of said arched base in spaced relation to each other, said tab having a free end severed from the base and extending inwardly toward the free end of said hook and said hook being biased toward said arched base and having its free end flared outwardly from said base, said bolt or screw engaging means overlying one of said openings, said hook extending through a second of said openings and engaging a marginal portion thereof, and said free end of said tab being in abutting relation to the wall of the third of said openings thereby retaining said hook against removal from attached position.

3. A fastener adapted for attachment to a supporting part in the form of a plate or panel provided with three openings in spaced relation comprising, a piece of sheet metal defining a rectangular base, said base comprising a portion carrying bolt or screw engaging means and a portion at one side of said means having a partially severed area defining a hook and a cooperating tab, both projecting from the underside of said base in spaced relation to each other, said tab having a free end which is severed from the base and which faces the free end of said hook, said means overlying one of said openings in the supporting part when the fastener is in attached position, said hook extending through a second of said openings and engaging a marginal portion thereof when the fastener is in attached position, and said tab extending into and being in abutting relation to the wall of the third of said openings when the fastener is in attached position thereby retaining said hook against removal from attached position.

References Cited in the file of this patent

UNITED STATES PATENTS

| | | |
|---|---|---|
| 2,168,721 | Tinnerman | Aug. 8, 1939 |
| 2,239,798 | Tinnerman | Apr. 29, 1941 |
| 2,516,274 | Tinnerman | July 25, 1950 |
| 2,566,886 | Hartman | Sept. 4, 1951 |
| 2,676,635 | Tinnerman | Apr. 27, 1954 |
| 2,689,992 | Flora | Sept. 28, 1954 |